Sept. 23, 1958 G. W. McARDLE 2,853,209
CONTAINER
Filed Jan. 13, 1955
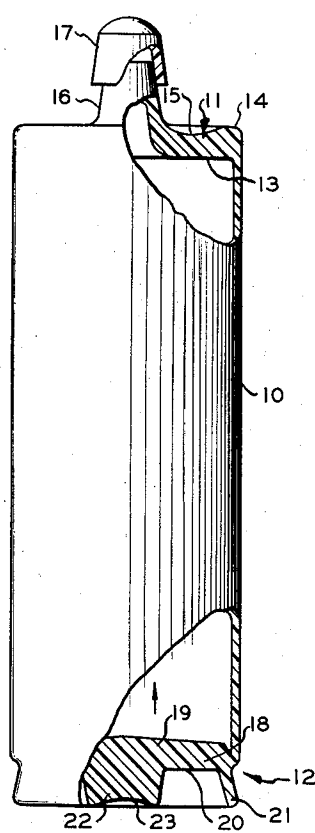
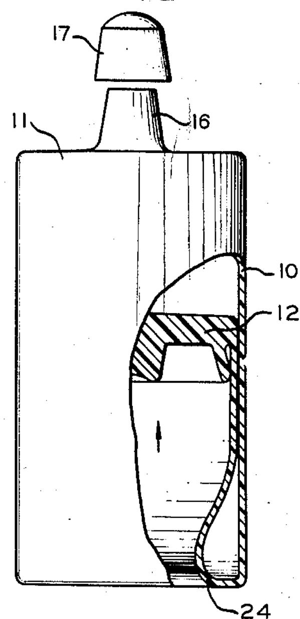
INVENTOR.
G.W. MC ARDLE
BY
Hudson & Young
ATTORNEYS United States Patent Office 2,853,209

Patented Sept. 23, 1958

2,853,209

CONTAINER

Gerald W. McArdle, Woods Cross, Utah, assignor to Phillips Petroleum Company, a corporation of Delaware Application January 13, 1955, Serial No. 481,551

2 Claims. (Cl. 222—107)

This invention relates to containers. In a specific aspect it relates to containers formed from deformable plastic materials which are arranged to dispense the contents of the container by deformation of the material. In still another aspect, it relates to such containers formed from special polyethylene materials.

Heretofore, considerable difficulties have been experienced with dispensing devices formed from deformable material. In many instances, the containers dent or are breakable. They are subject to rupture before the product is used up, and it is difficult to remove the entire contents of the container. Also, when subjected to the temperature of boiling water, the plastic material becomes soft with consequent permanent damage to or rupture of the container.

It is an object of this invention to provide a container of novel design which will have important advantages in substantially overcoming the disadvantages of previously-used containers.

It is a still further object to provide an inexpensive deformable plastic container formed from a special polyethylene material.

Various other objects, advantages and features of the invention will become apparent from the following detailed description taken in conjunction with the accompanying drawings, in which:

Figure 1 is a front elevational view, partially in section, of a container constructed in accordance with the invention; and Figure 2 is a front elevational view, partially in section, of the container shown by Figure 1 wherein the contents of the vessel have been partially discharged.

Referring now to the drawing in detail, it will be noted that the container, as exemplified in the drawing, is formed from a generally cylindrically body portion 10 of relatively thin material, and end sections 11, 12 of relatively thick material. The central or intermediate portion 10 of the container is formed from a deformable plastic material. Preferably and advantageously, this material is an aliphatic 1-olefin prepared by polymerization in the presence of a catalyst comprising chromium oxide, at least part of the chromium being in the hexavalent state. The production of such polymeric material is described in detail in the copending application of Hogan and Banks, Serial Number 333,576, filed January 27, 1953, now abandoned.

Where the 1-olefin thus polymerized is polyethylene, a material is obtained which is substantially free of branched vinyl unsaturation, and which is characterized by a high melting point, good stiffness, and excellent physical properties. Such a material is referred to herein as special polyethylene material. Where this material is utilized in forming the body or intermediate portion 10 of the container, the container can be readily subjected to sterilization, as by boiling, at elevated temperatures without damage to or rupture of the vessel.

The end portion or cap 11, which can advantageously be formed from special polyethylene material, has a flat inner surface 13 and an outer surface defined by a flat circumferential peripheral portion 14 and a dished or rounded inner section 15 which merges into a protruding nozzle 16 of generally frusto-conical configuration, the nozzle thereby being provided with a central opening communicating with the interior of the container. A cap 17 having its interior portion complementary with the nozzle 16 is arranged to close the opening in the nozzle and is secured thereto as by a friction fit, as shown, or by other suitable type of connection, as a threaded connection.

The other end 12 of the container, which can also advantageously be formed from special polyethylene material, includes a disk-like base portion 18 having a rounded inner surface 19 and an intermediate flat outer surface 20 flanked by a circumferential skirt or flange 21 and a central protrusion or button 22. The button 22 is adapted to be moved by the fingers of the user or, alternatively, by a push rod or other similar device and, for this purpose, there is a rounded cavity 23 formed at the outer end of the button 22. The skirt 21, at its lower end, is of larger diameter than the inner wall of the body portion 10 so that it exerts pressure against the portion 10 as it is pushed into the container, thus tending to retain the end portion 12 in position within the container as the contents are discharged.

In operation, the container is filled with a material, such as a paste, food product, or other flowable material, through the nozzle 16, and the cap 17 is attached thereto. When it is desired to remove the material from the container, the cap 17 is removed, and the button 23 is pushed inwardly by the finger of the user or a suitable push rod arranged to fit within the recessed portion 23. This presses the contents of the container outwardly through the nozzle 17. As the contents are discharged, the base or end portion 18 slides inwardly, as illustrated by Figure 2, along the inner walls of the intermediate portion 10. The part of the portion 10 adjacent the base 18 simply folds inwardly, as illustrated at 24 in Figure 2, and permits the described inward telescoping movement of the base 12 to take place. This inward movement occurs without distorting or rupturing the portion 10, and the folded portion 24 is sufficiently small that the fingers or push rod can be readily inserted into contact with the button 12 until the contents are completely discharged. Moreover, the enlarged skirt 21 tends to retain the base 12 in the position shown by Figure 2, since it is of larger diameter than the interior of the body portion 10.

It will be seen that the container of the invention has numerous important advantages. First, the container is of low cost since the intermediate portion 10 has only a single thickness, and no auxiliary or exterior support for the container is required. Second, the container is non-breakable, does not dent, and positively indicates the amount of contents remaining in the vessel at all times. The product is discharged without contact with human hands or other implements and the container does not break or rupture before the contents are completely discharged, as do many metal dispensing tubes. Finally, the product flow can be readily started, and complete use of the product is obtained because of the self-cleaning nature of the vessel, the shape being more attractive when the contents are partially discharged than is the case with containers where the end is rolled over as the product is utilized.

Moreover, where the container is formed from special polyethylene material, it can be sterilized or boiled without damage thereto, and the stiffness and improved physical properties of the special polyethylene material permit the foregoing advantages to be more completely realized.

While the invention has been described in connection with a present, preferred embodiment thereof, it is to be understood that this description is illustrative only and is not intended to limit the invention.

I claim:

1. A container comprising, in combination, a generally cylindrical body portion formed from a single sheet of deformable plastic material, a cap at one end of said body portion and formed integrally therewith, a nozzle having a frusto-conical shape protruding outwardly from said cap, a closure member detachably secured to said nozzle, an integral base portion closing the end of said body portion remote from said cap, said base portion being of smaller size than said body portion whereby said base portion can be telescoped within said body portion in contact therewith, said base portion having a central button protruding outwardly therefrom, so that the contents of the container are discharged through said nozzle when pressure is applied to said button, and a skirt protruding outwardly from the circumferential region of said base portion, the outer end of said skirt being of larger diameter than the inner surface of said body portion whereby, during the aforesaid telescoping action, the skirt presses outwardly against the body portion and thus forces the telescoped portion of the body against the inner wall of the untelescoped portion of said body and tends to retain said base portion in its inner position, said enlarged member and said body portion being formed from special polyethylene material prepared by polymerization in the presence of a catalyst comprising chromium oxide, at least part of the chromium being in the hexavalent state.

2. A container comprising, in combination, a generally cylindrical body portion formed from a single sheet of deformable plastic material, a cap at one end of said body portion and formed integrally therewith, a nozzle having a frusto-conical shape protruding outwardly from said cap, a closure member detachably secured to said nozzle, an integral base portion closing the end of said body portion remote from said cap, said base portion being of smaller size than said body portion whereby said base portion can be telescoped within said body portion in contact therewith, said base portion having a central button protruding outwardly therefrom, so that the contents of the container are discharged through said nozzle when pressure is applied to said button, and a skirt protruding outwardly from the circumferential region of said base portion, the outer end of said skirt being of larger diameter than the inner surface of said body portion whereby, during the aforesaid telescoping action, the skirt presses outwardly against the body portion and thus forces the telescoped portion of the body against the inner wall of the untelescoped portion of said body and tends to retain said base portion in its inner position.

References Cited in the file of this patent

UNITED STATES PATENTS

| | | |
|---|---|---|
| 598,676 | Lochmann | Feb. 8, 1898 |
| 687,790 | Scales | Dec. 3, 1901 |
| 1,272,921 | Crump | July 16, 1918 |
| 1,849,513 | Welsh | Mar. 15, 1932 |
| 2,430,718 | Jacobson | Nov. 11, 1947 |
| 2,531,745 | Schopmeyer | Nov. 28, 1950 |
| 2,577,321 | Filger | Dec. 4, 1951 |
| 2,684,791 | Sebell | July 27, 1954 |
| 2,717,721 | Gibson | Sept. 13, 1955 |

FOREIGN PATENTS

| | | |
|---|---|---|
| 89,650 | France | May 18, 1920 |
| 314,220 | Italy | Jan. 20, 1934 |
| 517,621 | Belgium | Feb. 28, 1953 |